(12) United States Patent
Fauchery et al.

(10) Patent No.: US 12,742,472 B2
(45) Date of Patent: Sep. 22, 2026

(54) CONNECTOR FOR CONNECTING FIRST AND SECOND MEMBERS

(71) Applicant: SKF Aerospace France S.A.S, Perrigny (FR)

(72) Inventors: Florent Denis Fauchery, Montmeyran (FR); Valentin Roger Claude Fleury, Romans-sur-Isère (FR); Anthony Roger Jeannot Jerome, Valence (FR); Arnaud Jean Auguste Turmeau, Chabeuil (FR); Florian Vincent Bardy, Perrigny (FR)

(73) Assignee: SKF Aerospace France S.A.S, Perrigny (FR)

( * ) Notice: Subject to any disclaimer, the term of this patent is extended or adjusted under 35 U.S.C. 154(b) by 191 days.

(21) Appl. No.: 18/883,245

(22) Filed: Sep. 12, 2024

(65) Prior Publication Data

US 2025/0092910 A1 Mar. 20, 2025

(30) Foreign Application Priority Data

Sep. 19, 2023 (FR) ................................. FR2309864

(51) Int. Cl.
*F16C 11/06* (2006.01)

(52) U.S. Cl.
CPC ........ *F16C 11/0628* (2013.01); *F16C 11/068* (2013.01); *F16C 2208/02* (2013.01)

(58) Field of Classification Search
CPC ..... F16C 11/06; F16C 11/0614; F16C 11/068; F16C 23/043; F16C 23/045; F16C 33/06; F16C 33/1095
See application file for complete search history.

(56) References Cited

U.S. PATENT DOCUMENTS 3,516,136 A 6/1970 Turner et al.
3,779,619 A * 12/1973 Van Dorn .............. F16C 33/00 384/206

(Continued)

FOREIGN PATENT DOCUMENTS

CN 102235425 A 11/2011
CN 118328078 A * 7/2024 ........... B23P 15/003

(Continued)

OTHER PUBLICATIONS

Search Report from the British Patent Office dispatched Dec. 19, 2024 in application No. GB2411157.7.

(Continued)

*Primary Examiner* — Jonathan P Masinick
(74) *Attorney, Agent, or Firm* — J-TEK LAW PLLC; Scott T. Wakeman; Mark A. Ussai

(57) ABSTRACT

A connector for connecting first and second members includes a body formed of a composite material including reinforcing fibers embedded in a plastic matrix made of resin, and having a fastening zone for the first member and a housing. A ball joint is swivelable within the housing of the body and has a bore for the fastening of the second member. A first fibrous strip, or a coating, has a coefficient of friction less than or equal to 0.1 and is positioned between the housing and the ball joint in contact with the ball joint. A second fibrous strip having a coefficient of friction greater than or equal to 0.2 is positioned between the housing and the ball joint in contact with the housing.

12 Claims, 2 Drawing Sheets

(56) References Cited

U.S. PATENT DOCUMENTS 4,080,233 A * 3/1978 McCloskey ......... F16C 11/0614 264/296
4,123,122 A * 10/1978 Gabrielson ............. F16C 33/24 384/902
4,235,711 A 11/1980 Koblanski
4,243,192 A 1/1981 Johnson
4,253,711 A 3/1981 Lynn et al.
5,328,273 A * 7/1994 Nonaka ............... F16C 11/0614 384/208
6,068,405 A * 5/2000 Harris ................... F16C 33/208 384/208
6,500,515 B1 12/2002 Fantino et al.
8,393,791 B2 3/2013 Thornton et al.
8,505,204 B2 8/2013 Reverchon
8,585,291 B2 11/2013 Bridgewater
8,690,438 B2 4/2014 Karaki et al.
9,227,280 B2 1/2016 Howard
9,261,132 B2 * 2/2016 McNeil ................... F16C 43/02
9,366,296 B2 6/2016 Abrudan et al.
9,400,013 B2 * 7/2016 Bell .................... F16C 33/1095
9,695,873 B2 * 7/2017 Bell ...................... F16C 33/201
9,702,406 B2 * 7/2017 Bell ...................... F16C 33/208
9,790,984 B2 * 10/2017 Masse ................... F16C 23/045
10,167,439 B2 1/2019 Tohyama et al.
10,247,228 B2 * 4/2019 Yu ....................... F16C 11/0638
10,851,838 B2 12/2020 Lawrence et al.
11,168,720 B2 * 11/2021 Turmeau ................... F16B 5/02
11,268,566 B2 3/2022 Turmeau et al.
11,446,848 B2 * 9/2022 Turmeau ............... B29C 43/184
12,071,980 B2 * 8/2024 Zhou ..................... F16C 33/121
2007/0223850 A1 * 9/2007 Lopes ................... F16C 33/201 384/192
2008/0040886 A1 2/2008 Arnold et al.
2008/0104845 A1 5/2008 Lee et al.
2008/0289183 A2 11/2008 Lee et al.
2009/0154990 A1 6/2009 Julliere
2009/0304315 A1 12/2009 Johnson
2011/0038576 A1 2/2011 Thornton et al.
2011/0262059 A1 10/2011 Karaki et al.
2011/0272536 A1 11/2011 Valembois
2012/0051679 A1 3/2012 Bridgewater
2012/0291287 A1 11/2012 Reverchon
2013/0287326 A1 * 10/2013 Porter ................... F16C 11/068 384/322
2013/0287479 A1 10/2013 Valembois et al.
2015/0198204 A1 7/2015 Abrudan et al.
2015/0211579 A1 7/2015 Lawrence et al.
2016/0114884 A1 4/2016 Mandel et al.
2017/0368552 A1 12/2017 Plumb
2018/0163758 A1 6/2018 Fauchery et al.
2018/0347622 A1 12/2018 Turmeau et al.
2023/0151852 A1 * 5/2023 Polanco .................. F16C 31/02 384/213

FOREIGN PATENT DOCUMENTS

DE 10124843 A1 * 11/2002 ............ F16C 23/045
DE 202004013252 U1 12/2005
DE 69929551 T2 11/2006
EP 0818289 A2 1/1998
EP 2379313 B1 3/2014
EP 2711214 A1 3/2014
EP 2665597 B1 3/2015
EP 2955400 A1 12/2015
EP 3076039 A1 9/2016
EP 3742013 A1 * 11/2020 ............ F16C 33/201
FR 3067073 A1 12/2018
FR 3067073 B1 7/2019
GB 1233103 A 5/1971
GB 2021702 A 12/1979
GB 2564558 A 1/2019
JP S60151414 A 8/1985
WO WO-2014161560 A1 * 10/2014 ............ F16C 23/045

OTHER PUBLICATIONS

Preliminary Search Report from the French Patent Office dated Mar. 28, 2024 in related French application No. FR2309864, including Search Report and Written Opinion.

* cited by examiner

CONNECTOR FOR CONNECTING FIRST AND SECOND MEMBERS

CROSS-REFERENCE

This application claims priority to French patent application no. 2309864 filed on Sep. 19, 2023, the contents of which are fully incorporated herein by reference.

BACKGROUND OF THE INVENTION

The present invention generally relates to connectors used to connect two members to each other, more particularly to a connector, such as a fitting or shackle, including a body made of composite material and a ball joint mounted within the body.

Traditionally, in the aeronautical field, use is made of connectors such as metal fittings, for example made of aluminum, titanium or steel. Such connecting pieces serve to connect two members in relative swiveling motion by way of a ball joint interposed between the members and incorporated in the connecting piece. Such a fitting may be used for attachment of a thrust reverser cowl of an aircraft turbine.

The use of a connecting piece formed at least partially of a composite material, i.e. of polymer material reinforced with fibers such as glass or carbon fibers, is particularly advantageous for fields in which weight reduction is essential, such as for example in aeronautics.

For example, French Patent Publication No. 3067073 discloses a connecting piece including a body made of composite material with reinforcing fibers embedded in a plastic matrix made of resin, such that the reinforcing fibers and the resin form plies or sheets that are stacked in order to form a laminate. A mounting ring, interposed between the ball joint and the housing of the body in which ball joint is mounted, reduces the impact of the repeated forces generated during the swiveling. However, the integration of the mounting ring is expensive and burdensome, and also makes the structure heavier.

Another embodiment disclosed in French Patent Publication No. 3067073 consists of the connecting piece including the body as generally described above, but with the mounting ring replaced with a self-lubricating fabric. However, in the event of significant axial and radial loads applied to the body by the ball joint, the resin between the plies at the interface with the ball joint is tensioned. Repeated forces then have the effect of separating the plies, leading to premature delamination of the composite material around the housing formed to receive the ball joint.

SUMMARY OF THE INVENTION

The present invention therefore aims to remedy the drawbacks discussed above and to propose a lightweight and inexpensive connector which is able to withstand tensile and compressive radial and axial loads in order to offset the risks of delamination of the body of the connector.

The present invention is therefore directed to a connector for connecting first and second members comprising:

- a body made of composite material comprising reinforcing fibers embedded in a plastic matrix made of resin, comprising a fastening zone for the first member;
- a ball joint that is able to move by swiveling in a housing of the body and comprising a bore for the fastening of the second member;
- a first fibrous strip or a coating having a coefficient of friction less than or equal to 0.1, positioned between the housing and the ball joint, in contact with the ball joint; and
- a second fibrous strip having a coefficient of friction greater than or equal to 0.2, positioned between the housing and the ball joint, in contact with the housing.

Such a connector has reduced weight and increased compactness provided in a manner that is compatible with an aerospace application while at the same time ensuring, on the one hand, friction properties that are sufficiently low for articulation of the ball joint that is effective and without risk of delamination under an endurance load and, on the other hand, friction properties that are sufficiently high to protect the body of the connector from any risk of delamination under axial and radial loads.

The connector according to the invention is reliable and inexpensive and has an optimized service life. Advantageously, the first and second fibrous strips are positioned in contact with one another.

According to an alternative embodiment, in which the first fibrous strip is replaced with a coating, the second fibrous strip and the coating may be positioned in contact with one another. As used in the present application, the term "coating" is understood to mean a layer applied by chemical treatment or a layer affixed to an outer surface of the ball joint.

Preferably, the first fibrous strip or the coating includes lubricating particles formed of lubricating fibers impregnated with a binder, such as a resin, and/or at least one solid lubricant, the lubricating particles or the solid lubricant preferably comprising a fluoropolymer, such as polytetrafluoropolymer, graphite, molybdenum sulfide, hexagonal boron nitride or a mixture of these.

The lubricating particles make it possible to lower the coefficient of friction of the first fibrous strip and to limit friction between the body and the ball joint during the swiveling.

Preferably, the first fibrous strip includes structural fibers chosen from glass and/or carbon fibers. The structural fibers reinforce the lubricating particles, such as fibers, which has a lower mechanical performance or strength compared with the structural fibers, and as such may be torn under loading during the relative movement between ball joint and the body of the connector.

Advantageously, the second fibrous strip may include structural fibers impregnated with a binder, such as a resin, the structural fibers being selected from glass and/or carbon fibers. Such structural fibers limit the risk of delamination of the body of the connector.

Preferably, the second fibrous strip includes a composite material identical to the composite material of the body, in order to increase the compatibility between the body and the second fibrous strip.

According to one feature, the reinforcing fibers of the body form, with the resin, plies or sheets extending perpendicular to an axis of the housing, and the second fibrous strip may have plies extending substantially perpendicular to the plies of the body. Such a laminated structure reinforces the structure of the connector and further reduces the chances of separation of the plies of the body of the connector during swiveling movement of the ball joint.

In one embodiment, the first and second fibrous strips may be fastened to the body such that the ball joint is in motion relative to the assembly formed of the body and the first and second fibrous strips. Such an arrangement is particularly easy to fabricate, making it easier to manufacture the connector and reducing the manufacturing time thereof, and enables integration of any type of ball joint within the body of the connector.

According to an alternative, the first fibrous strip or the coating may be fastened to the ball joint and the second fibrous strip may be fastened to the body, such that an assembly formed by the ball joint and the first fibrous strip or the coating is movable relative to an assembly formed by the body and the second fibrous strip.

In another embodiment, the second fibrous strip may be fastened to the body by impregnation of the plastic matrix made of resin of the body.

According to an alternative, the first and second fibrous strips may be fastened to the body by impregnation of the plastic matrix made of resin of the body. This makes integration of the first and second fibrous strips easier and makes it possible to consolidate the assembly formed by the body and the first and second fibrous strips.

In another alternative embodiment, the first fibrous strip may be fastened to the ball joint by adhesive bonding.

In one embodiment, the second fibrous strip may be fastened to the body by adhesive bonding.

In a further embodiment, both of the first and second fibrous strips may be fastened to the body by adhesive bonding. In this case, the second fibrous strip may be fastened in contact with the housing of the body and the first fibrous strip may be fastened in contact with the second fibrous strip.

BRIEF DESCRIPTION OF THE SEVERAL VIEWS OF THE DRAWINGS

Further aims, advantages and features will become apparent from the following description, which is given purely by way of illustration and with reference to the appended drawings, in which.

DETAILED DESCRIPTION OF THE INVENTION

Figure 1:
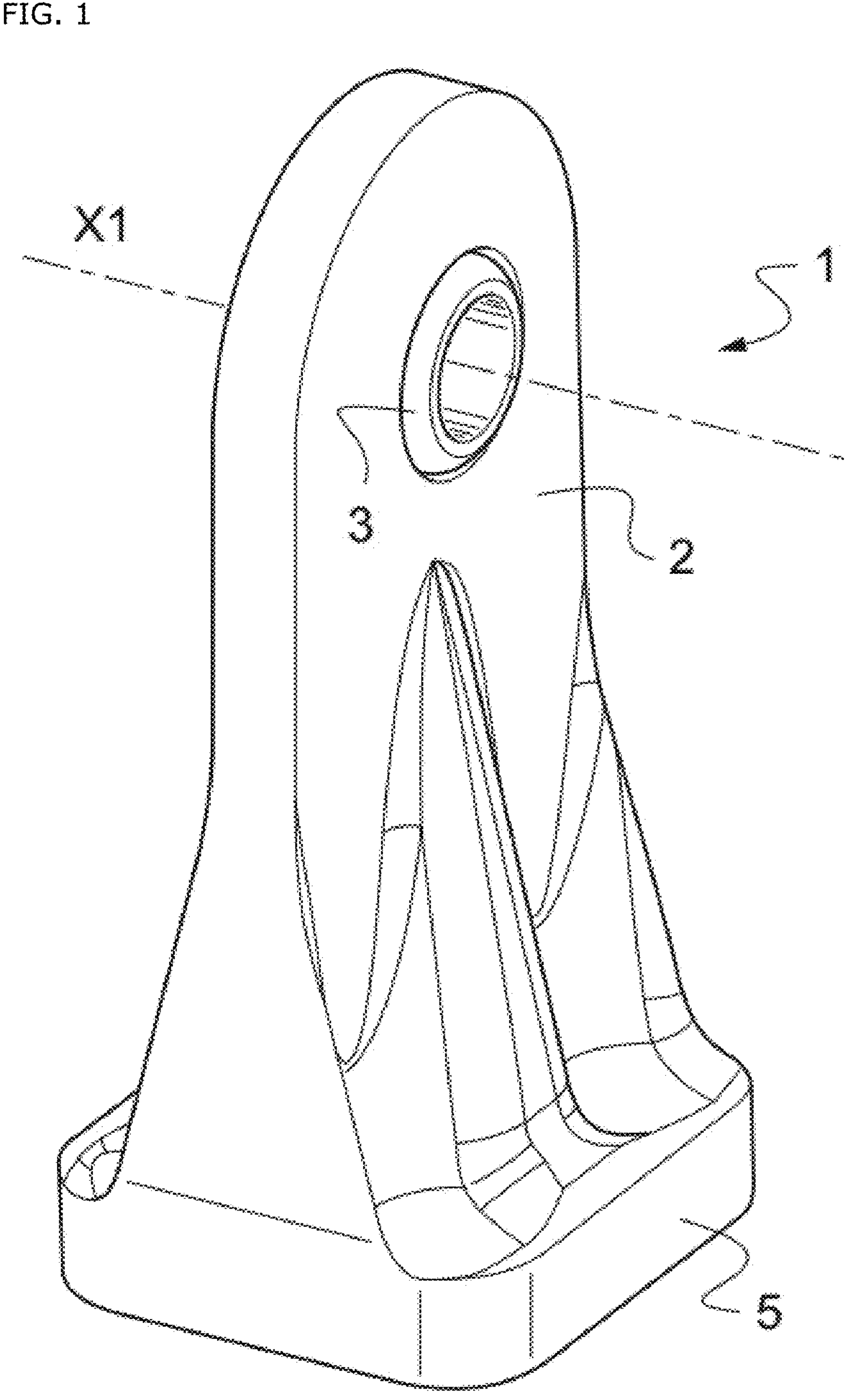
FIG. 1 is a perspective view of a fitting according to one embodiment of the invention.
Figure 2:
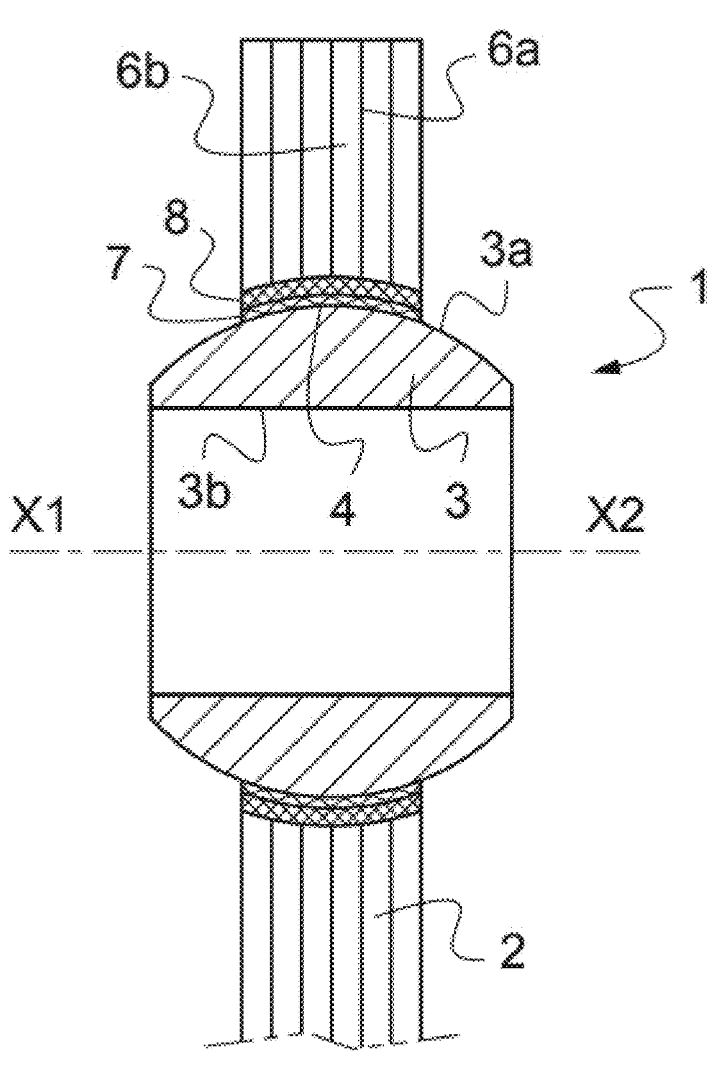
FIG. 2 is a view in transverse cross section of the fitting illustrated in FIG. 1.

FIGS. 1 and 2 depict a connector 1 intended to connect first and second members (not shown). In the illustrated embodiment, the connector 1 is a fitting intended for an application in the aerospace field.

The connector 1 comprises a body 2 made of composite material having reinforcing fibers embedded in a plastic matrix **6*b*. The fibers are, advantageously, made of carbon, but may be made of another material, such as glass. The plastic matrix 6*b*** is preferably formed of thermosetting resin, for example epoxy, but other materials such as thermoplastic resins, for example PEEK, PEKK, PEAK, may be used.

The body 2 of the connector 1 includes a fastening zone for the first member to be connected, which, in the example illustrated, takes the form of a base 5. Means for fastening the first member to the connector 1, specifically to the base 5, may include screws, rivets or any other appropriate fasteners. The body 2 also includes a housing 4 having an axis X1 and being delimited or defined by an inner surface or bore of the body 2

The connector 1 also comprise a ball joint 3 disposed or mounted within the housing 4 of the body 2. Preferably, the ball joint 3 is metallic, for example made of titanium, steel, aluminum, bronze or an alloy of these. The housing 4 is spherical so as to cooperate with or complement the ball joint 3.

The ball joint 3 has an axis X2 and is capable of moving by swiveling within the housing 4 of the body 2; i.e., the ball joint 3 is configured to swivel within the housing 4. The connector 1 thus enables a rigid connection of the first and second members while at the same time allowing them to be articulated to each other, specifically by swiveling of the ball joint 3 within the housing 4.

The ball joint 3 may be formed of two parts that can be separated in order to allow the mounting of the ball joint 3 within the housing 4. Advantageously, the ball joint 3 has a spherical outer surface **3*a* intended to cooperate with a complementary inner surface of housing 4 for the articulation of the ball joint 3, and an inner surface or bore 3*b* for the fastening of the second member. In the depicted example, the bore 3*b* is cylindrical and has an axis X2**.

The reinforcing fibers of the body 2 form, with the resin, plies or sheets **6*a*. These plies/sheets 6*a* are stacked so as to form a laminate or laminated structure, as is illustrated in FIG. 2, which depicts a longitudinal section of the connector 1 on a plane passing through the axis X1 and that is parallel to the plies 6*a* of the body 2**.

Advantageously, in order to simplify the manufacture of the body 2 of the connector 1, the plies **6*a* are mutually parallel. In addition, the plies 6*a* extend over the entire length of the body 2, with the exception of the zone of the housing 4, in which they are partially interrupted in order to obtain the housing 4**, for example by removal of material.

Furthermore, the connector 1 also comprises a first fibrous strip 7 having a coefficient of friction less than or equal to 0.1, positioned between the housing 4 and the ball joint 3 and in contact with the ball joint 3.

The first fibrous strip 7 performs a lubricating function and makes it possible to maintain an endurance load between the body 2 and the ball joint 3 by reducing friction at the interface with the ball joint 3, and this also reduces the risks of delamination of the body 2.

The first fibrous strip 7 may include lubricating particles including lubricating fibers impregnated with a binder, such as a resin. The first fibrous strip 7 may also comprise, in addition to or instead of the lubricating particles, at least one solid lubricant.

For example, the lubricating particles or the solid lubricant may comprise a fluoropolymer, such as polytetrafluoropolymer, graphite, molybdenum sulfide, hexagonal boron nitride or a mixture of two or more of these materials.

Preferably, the first fibrous strip 7 also includes structural fibers in addition to the lubricating particles, in particular the lubricating fibers. The structural fibers reinforce the first fibrous strip 7, in particular by maintaining or reinforcing the lubricating particles (e.g., fibers) which have a lower mechanical strength and which otherwise may tear under loading during the relative movement between ball joint 3 and the body 2 of the connector 1.

The structural fibers also provides the connector 1 with the ability to withstand opening loads that are transmitted to the body 2 of the connector 1 during the pivoting of the ball joint 3 when bearing the second member and which may otherwise tend to separate the plies **6*a* of the body 2**.

The structural fibers of the first fibrous strip 7 may be chosen from glass fibers, carbon fibers or a mixture of these fibers. Advantageously, the first fibrous strip 7 may be a self-lubricating fabric.

According to an alternative, the first fibrous strip 7 may be replaced with a coating, applied at least partially to the outer surface 3a of the ball joint 3, and having a coefficient of friction less than or equal to 0.1. Such a coating may be a layer formed by chemical treatment of the outer surface of the ball joint 3 or a layer affixed to the outer surface of the ball joint 3, such as forming a liner.

Preferably, the coating is applied to the entire outer surface 3a of the ball joint 3. The coating may comprise lubricating particles including lubricating fibers impregnated with a binder, such as a resin.

The coating may also comprise, in addition to or instead of the lubricating particles, at least one solid lubricant.

For example, the lubricating particles or the solid lubricant may comprise a fluoropolymer, such as polytetrafluoropolymer, graphite, molybdenum sulfide, hexagonal boron nitride or a mixture of these.

Preferably, the coating also comprises structural particles, such as fibers, for example glass fibers, carbon fibers or a mixture of these fibers.

In addition, the connector 1 further comprises a second fibrous strip 8 having a coefficient of friction greater than or equal to 0.2, positioned between the housing 4 and the ball joint 3, and in contact with the housing 4.

In the illustrated example, the first fibrous strip 7 and the second fibrous strip 8 are positioned in contact with each other. Specifically, the first fibrous strip 7 has an inner surface in contact with the outer surface 3a of the ball joint 3 and an opposing outer surface in contact with an inner surface of the second fibrous strip 8. The second fibrous strip 8 has an inner surface in contact with the outer surface of the first fibrous strip 7, or of the coating, and an outer surface in contact with the housing 4.

According to an alternative embodiment, in which the first fibrous strip 7 is replaced with a coating, the second fibrous strip 8 and the coating may be positioned in contact with each other. Specifically, the coating has an inner surface in contact with the outer surface 3a of the ball joint 3 and an opposite outer surface in contact with an inner surface of the second fibrous strip 8. The second fibrous strip 8 has an inner surface in contact with the outer surface of the coating and an outer surface in contact with the housing 4.

Preferably, the second fibrous strip 8 comprises structural fibers impregnated with a binder, such as a resin. The structural fibers may be chosen from glass fibers, carbon fibers or a mixture of such fibers.

The second fibrous strip 8 is preferably formed of a composite material identical to the composite material of the body 2, in order to improve the compatibility between the body 2 and the second fibrous strip 8.

In the depicted example, the reinforcing fibers of the body 2 form, with the resin, plies 6a or sheets 6a extending perpendicular to the axis X1 of the housing 4, at least within the zone of the body 2 around the housing 4 extending over a few millimeters or tens of millimeters, and this provides an increase in both tensile and compressive strength.

The second fibrous strip 8 may also have plies or sheets. Preferably, the plies/sheets of the second fibrous strip 8 extend transversely along the fibrous strip 8, so as to extend substantially perpendicular to the plies/sheets 6a of the body 2.

The first fibrous strip 7 may also have at least one ply or sheet.

Preferably, the thickness of the first fibrous strip 7, the thickness of the coating and the thickness of the second fibrous strip 8 are each between about one-half millimeter (0.5 mm) and about five millimeters (5 mm).

For example, the first fibrous strip 7 and the second fibrous strip 8 respectively have a proportion of 10% and 90% plies or sheets. This ratio may be adjusted as a function of the required ratio between swiveling endurance stress and static load.

In one embodiment, the first and second fibrous strips 7, 8, respectively, may be fastened to the body 2. In this way, the ball joint 3 is movable relative to an assembly formed by the body 2 and the first and second fibrous strips 7, 8.

In an alternative embodiment, the first fibrous strip 7, or the coating, may be fastened to the ball joint 3, while the second fibrous strip 8 is fastened to the body 2. As such, an assembly formed by the ball joint 3 and the first fibrous strip 7, or the coating, is movable relative to an assembly formed by the body 2 and the second fibrous strip 8.

Preferably, the fastening of the second fibrous strip 8 or the fastening of both the first and second fibrous strips 7, 8 to the body 2 is accomplished by impregnation of the plastic matrix 6b made of resin of the body 2.

As an alternative, the first fibrous strip 7, the second fibrous strip 8 or the first and second fibrous strips 7, 8 may be fastened by adhesive bonding.

According to one example, the second fibrous strip 8 may be fastened in contact with the housing 4 by means of an adhesive, and the first fibrous strip 7 may be fastened in contact with the second fibrous strip 8, also by means of adhesive.

According to another example, the second fibrous strip 8 may be fastened in contact with the housing 4 by means of an adhesive and the first fibrous strip 7 may be fastened in contact with the ball joint 3, also by means of adhesive.

In the example illustrated, the connector 1 is configured to connect two members.

As an alternative, the connector 1 may be implemented to connect three or more members to each other.

Furthermore, the invention may be applied to a type of connector other than a fitting, for example a rod end or a shackle, for example also for an application in the aerospace field or any other technical field.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A connector for connecting first and second members, comprising:

a body formed of a composite material including reinforcing fibers embedded in a plastic matrix formed of resin, the body having a fastening zone for the first member and a housing;

a ball joint configured to swivel within the housing of the body and having a bore for the fastening of the second member;

a first fibrous strip or a coating having a coefficient of friction less than or equal to 0.1, positioned between the housing and the ball joint and in contact with the ball joint; and a second fibrous strip having a coefficient of friction greater than or equal to 0.2, positioned between the housing and the ball joint and in contact with the housing.

2. The connector according to claim 1, wherein the first fibrous strip or the coating includes lubricating particles formed of lubricating fibers impregnated with a binder and/or at least one solid lubricant.

3. The connector according to claim 2, wherein the binder is resin and/or the lubricating fibers or the solid lubricant is one of polytetrafluoropolymer, graphite, molybdenum sulfide and hexagonal boron nitride or a mixture of at least two of polytetrafluoropolymer, graphite, molybdenum sulfide and hexagonal boron nitride.

4. The connector according to claim 2, wherein the first fibrous strip includes structural fibers selected from glass fibers and/or carbon fibers.

5. The connector according to claim 1, wherein the second fibrous strip includes structural fibers impregnated with a binder.

6. The connector according to claim 5, wherein the binder is a resin and/or the structural fibers are selected from glass fibers and/or carbon fibers.

7. The connector according to claim 1, wherein the second fibrous strip is formed of a composite material identical to the composite material of the body.

8. The connector according to claim 1, wherein the housing has an axis, the reinforcing fibers and the resin of the body form plies extending perpendicular to the axis of the housing, and the second fibrous strip includes plies extending substantially perpendicular to the plies of the body.

9. The connector according to claim 1, wherein:

the first fibrous strip and the second fibrous strip are positioned in contact with each other; or the coating and the second fibrous strip are positioned in contact with each other.

10. The connector according to claim 1, wherein the first fibrous strip and the second fibrous strip are each fastened to the body such that the ball joint is movable relative to an assembly formed by the body, the first fibrous strip and the second fibrous strip.

11. The connector according to claim 1, wherein:

the second fibrous strip is fastened to the body by impregnation of the plastic matrix of the body; or both of the first fibrous strip and the second fibrous strip are fastened to the body by impregnation of the plastic matrix of the body.

12. The connector according to claim 1, wherein the first fibrous strip and/or the second fibrous strip are fastened to the body or to the ball joint by an adhesive.

* * * * *